United States Patent [19]

Coats

[11] 4,199,178
[45] Apr. 22, 1980

[54] DOOR LATCH

[76] Inventor: Richard A. Coats, 914 Farwood Ave., Fort Wayne, Ind. 46816

[21] Appl. No.: 925,999

[22] Filed: Jul. 19, 1978

[51] Int. Cl.² .............................................. E05C 3/04
[52] U.S. Cl. .................................................. 292/205
[58] Field of Search ................. 292/67, 191, 192, 290, 292/292, 304

[56] References Cited

U.S. PATENT DOCUMENTS

| | | | |
|---|---|---|---|
| 52,050 | 1/1866 | Illingworth | 292/290 |
| 148,574 | 3/1874 | Mowbray | 292/297 |
| 240,353 | 4/1881 | Alexander | 292/63 |
| 405,581 | 6/1889 | Marshall, Jr. et al. | 292/292 |
| 603,477 | 5/1898 | Butts | 292/297 |
| 957,600 | 5/1910 | Deming | 292/57 |
| 1,194,080 | 8/1916 | Schaum | 220/243 |
| 1,354,222 | 9/1920 | Sibley | 292/59 |
| 1,650,454 | 11/1927 | Langan | 292/67 |
| 1,792,537 | 2/1931 | Irwin | 23/221 K |
| 1,877,263 | 9/1932 | Beauchamp | 292/283 |
| 2,621,064 | 12/1952 | Ware | 292/302 |
| 2,828,990 | 4/1958 | Brown | 292/67 |
| 3,633,390 | 1/1972 | Wartian | 292/DIG. 14 |
| 4,072,333 | 2/1978 | Hutter | 292/292 |

Primary Examiner—Richard E. Moore
Attorney, Agent, or Firm—Gust, Irish, Jeffers & Hoffman

[57] ABSTRACT

A door latch includes a plate member secured to the door jamb and extending therefrom generally parallel with one side of the door in its closed position. A stud on the plate member extends through an opening in the door in the closed position thereof and has an end portion projecting beyond the other side of the door. The end portion of the stud is bifurcated by having an open-ended slot formed therein. An elongated latch member has an elongated, inclined slot formed therein, the latch member being pivotally connected to the end portion of the stud by means of a pin spanning the two legs of the end portion and extending through the slot, the latch member being thereby pivotally movable from a first position extending axially outwardly from the stud to permit opening and closing of the door, and a second, latching position in which one side of the latch member engages the other side of the door in its closed position, the inclination of the slot providing a wedging action in co-operation with the pin so as to wedge the side of the latching member against the other side of the door.

2 Claims, 5 Drawing Figures

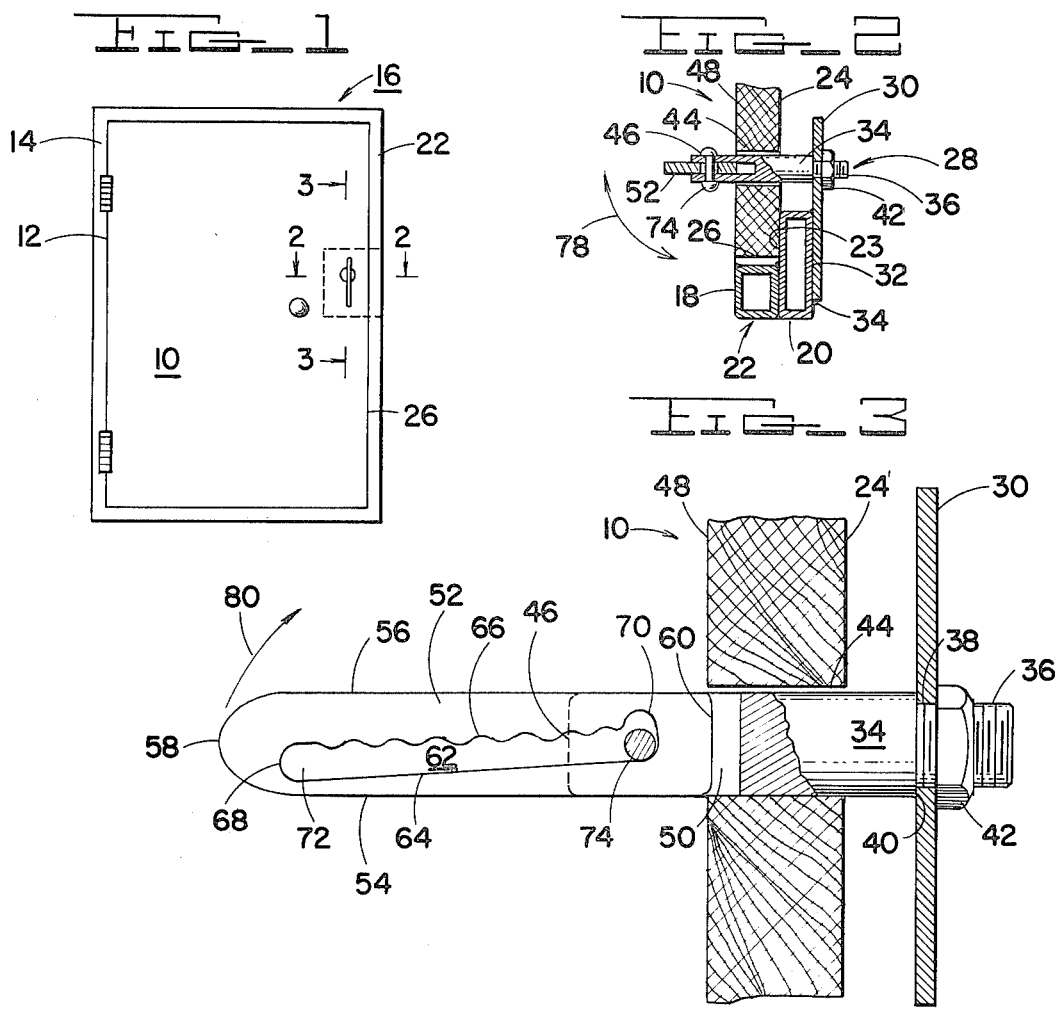
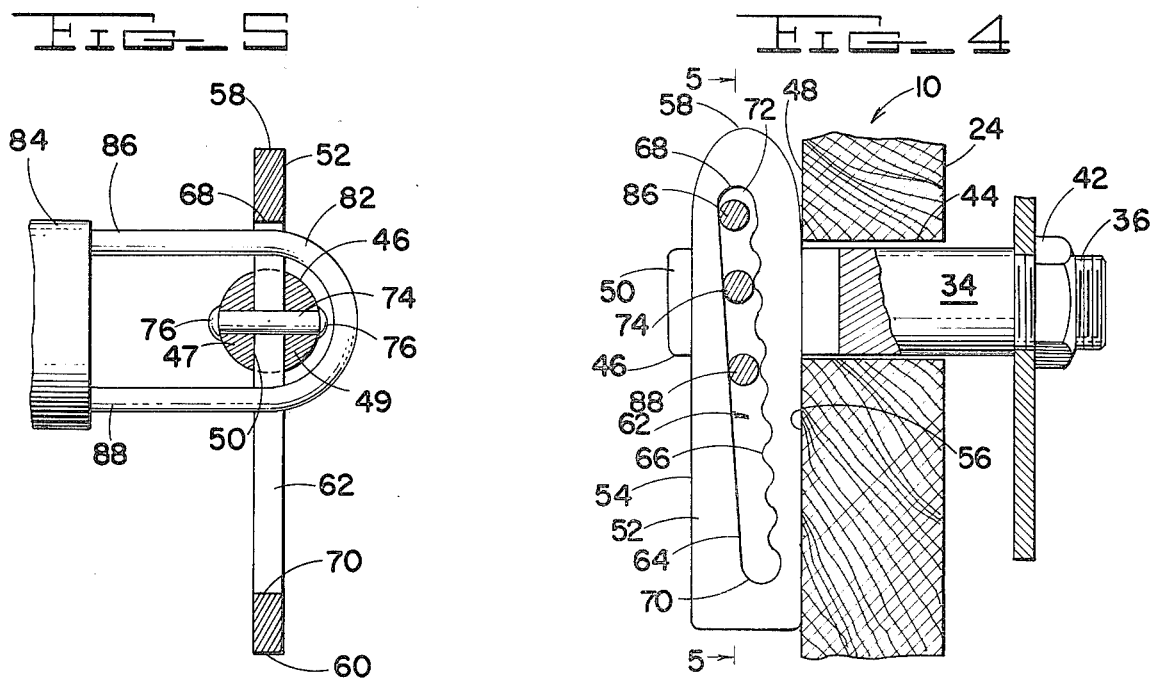

DOOR LATCH

BACKGROUND OF THE INVENTION

1. Field of the Invention

This invention relates generally to door latches, and more particularly to an improved door latch which forces the door into tightly closed position.

2. Description of the Prior Art

Conventional door latches known to the present applicant merely retain a door in its closed position. While door latches have been proposed which are adapted to urge the door into a tightly closed position, those known to the present applicant have been characterized by their relatively complexity and thus relatively high cost.

It is therefore desirable to provide a door latch of the type which urges the door to a tightly closed position, but which nevertheless the characterized by its simplicity and thus relatively low cost.

SUMMARY OF THE INVENTION

The invention, in its broader aspects, provides a latch assembly for a door comprising a plate member secured to the door jamb and extending therefrom generally parallel with the side of the door which engages the door jamb in the closed position of the door. A stud on the plate member extends through the door frame opening, and the door has an opening formed therethrough between its sides, the stud extending through that opening in the closed position of the door and having an end portion projecting beyond the other side of the door. A latch member is provided along with pivot means for connecting the latch member to the end portion of the stud for pivotal movement between a first position forming an extension of the stud and a second position generally at a right angle with respect to the stud. The latch member in its first position is adapted to pass through the opening in the door thereby permitting opening and closing of the door, and the latch member in its second position engages the other side of the door in its closed position. The latch member includes means cooperating with the pivot means for wedging the latch member into its second position against the other side of the door in its closed position.

It is therefore an object of the invention to provide an improved door latch.

Another object of the invention is to provide an improved door latch which urges the door into a tightly closed position.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side elevational view of a door and surrounding door frame incorporating the improved door latch of the invention;

FIG. 2 is a fragmentary, cross-sectional view taken generally along the line 2—2 of FIG. 1;

FIG. 3 is a fragmentary, cross-sectional view taken generally along the line 3—3 of FIG. 1 and showing the latch assembly of the invention in its open position;

FIG. 4 is a fragmentary, cross-sectional view similar to FIG. 3 but showing the latch of the invention in its closed position; and FIG. 5 is a cross-sectional view taken generally along the line 5—5 of FIG. 4.

DESCRIPTION OF THE PREFERRED EMBODIMENT

Referring now to the figures of the drawing, a conventional door 10 is shown having side edge 12 hinged to side member 14 of door frame 16. Door frame 16 may be conventional metal constuction comprising first and second tubular portions 18, 20, connected together, as by welding, as shown in FIG. 2. Door frame 16 includes jamb member 22 having surface 23 which engages side 24 of door 10 adjacent side edge 26 opposite hinged edge 12 in the closed position of the door. It will readily understood that door 10 is thus pivotally moved in conventional fashion between a closed position closing the opening formed by frame 16, as shown in the drawing, and an open position (not shown).

Latch assembly 28 comprises plate member 30 secured to side 32 of jamb member 22 in any suitable manner, as by welding at 34. Plate member 30 extends in spaced, parallel relationship with side 24 of door 10 in the closed position of the door. Stud 34 has threaded end 36 extending through opening 38 in plate member 30 and shoulder 40 engaging one side of plate member 30, nut 42 on threaded end 36 engaging the other side of plate member 30 thus securing stud 34 to plate member 30, as shown. Stud 34 extends through opening 44 extending between sides 48, 44 of door 10 adjacent edge 26 in the closed position of the door. Stud 34 had end portion 46 which projects beyond side 48 of door 10 in its closed position.

End portion 46 of stud 34 is bifurcated to define open ended slot 50. Elongated latch member 52 is provided having parallel side edges 54, 56 and opposite ends 58, 60. Latch member 52 has elongated slot 62 formed therein having straight side edge 64 spaced from undulating side edge 66 respectively extending between opposite ends 68, 70. Slot 62 is inclined upwardly with respect to side edge 54 of latch member 52 from its end 68 toward its end 70. End portion 72 of slot 62 may have straight, parallel sides respectively parallel with side edges 54, 56 of latch member 52, as shown.

Pin 74 extends transversely between legs 47, 49 of end portion 46 through slot 62 in latch member 52 and spanning slot 50. Ends 76 of pin 74 may be headed, as shown, thereby to retain pin 74 in its assembled position.

Referring now particularly to FIG. 3, latch member 52 has a first, extended position extending in axial alignment with stud 34 with pin 74 adjacent end 70 of slot 62, thereby permitting opening and closing of door 10, as shown by arrows 78 in FIG. 2; it will be understood that latching member 52 may pivot slightly about pin 74 thereby to accommodate the pivotal motion of door 10 about its hinged side edge 12. With door 10 in its closed position, end 58 of latch member 52 may be manually raised and pivoted about pin 74, as shown by arrow 80 in FIG. 3, and then manually shoved downwardly to the position shown in FIG. 4 with side edge 56 engaging side 48 of door 10, pin 74 cooperating with the inclined side edge 64 and undulating side edge 66 of slot 62 to provide a wedging action thereby to force side 24 of door 10 into tight engagement with surface 23 of jamb member 22. Reference to FIGS. 4 and 5 will reveal that in the second, latching position of latch member 52, hasp 82 of conventional lock 84 may have its legs 86, 88 respectively passed through end portion 72 of slot 62 above end portion 46 of stud 34, and through slot 62 below end portion 46, thereby securely to retain latch member 52 in its latched position and to prevent opening of door 10.

While there have been described above the principles of this invention in connection with specific apparatus, it is to be clearly understood that this description is made only by way of example and not as a limitation to the scope of the invention.

What is claimed is:

1. In combination with a door having opposite sides and edges, one of said edges being hinged to a door frame for pivotal movement of said door between an open position and a closed position closing the opening defined by said frame, said frame including a jamb engaging one side of said door in the closed position thereof adjacent the edge opposite said one edge thereof, a latch assembly comprising: a plate member secured to said jamb and extending therefrom generally parallel with said one side of said door in said closed position thereof; a stud on said plate member extending through said door frame opening, said door having an opening formed therethrough between said sides and adjacent said opposite edge, said stud extending through said opening in said closed position of said door and having an end portion projecting beyond the other side thereof; a latch member; and pivot means for connecting said latch member to said end portion of said stud for pivotal movement between a first position forming an extension of said stud, and a second position generally at a right angle with respect to said stud; said latch member in said first position thereof being adapted to pass through said opening thereby permitting opening and closing of said door, said latch member in said second position thereof engaging said other side of said door in said closed position thereof; said latch member including means cooperating with said pivot means for wedging said latch member in said second position thereof against said other side of said door in said closed position thereof; said end portion of said stud having an axially extending, open-ended slot formed therein, said latch member having a portion in each position thereof disposed in said slot, said pivot means comprising a pin extending through an opening in said latch member and across said slot; said latch member being elongated and having opposite, generally parallel side edges and opposite ends, said wedge means comprising said latch member opening, said latch member opening being elongated to form a slot having ends respectively extending toward said latch member ends, said opening being inclined with respect to said side edges of said latch member; said latch member slot having opposite sides, one of said sides being substantially straight and the other being undulating; one of said side edges of said latch member in said second position thereof engaging said other side of said door in said closed position thereof, one of said latch member ends extending axially outwardly from said end portion of said stud and the other of said latch member ends being disposed in said stud slot in said first position of said latch member, said latch member slot being inclined toward said one side edge in the direction from said one latch member end to the other, said undulating side of said latch member slot being adjacent said one side edge whereby said one latch member end extends upwardly in said second position thereof, a portion of said latch member intermediate said ends being disposed in said stud slot in said second position of said latch member.

2. The combination of claim 1 wherein the end of said latch member slot which extends toward said one end of said latch member projects upwardly beyond end portion of said stud in said second position of said latch member.

* * * * *